United States Patent
Godkin

(10) Patent No.: US 7,362,012 B2
(45) Date of Patent: Apr. 22, 2008

(54) IRONCORE LINEAR BRUSHLESS DC MOTOR WITH REDUCED DETENT FORCE

(75) Inventor: Mikhail Godkin, San Diego, CA (US)

(73) Assignee: BEI Sensors and Systems Company, Inc., Sylmar, CA (US)

( * ) Notice: Subject to any disclaimer, the term of this patent is extended or adjusted under 35 U.S.C. 154(b) by 144 days.

(21) Appl. No.: 10/860,361

(22) Filed: Jun. 2, 2004

(65) Prior Publication Data

US 2004/0217659 A1  Nov. 4, 2004

Related U.S. Application Data

(63) Continuation-in-part of application No. 10/116,495, filed on Apr. 3, 2002, now Pat. No. 6,919,660.

(60) Provisional application No. 60/476,741, filed on Jun. 6, 2003, provisional application No. 60/282,546, filed on Apr. 9, 2001.

(51) Int. Cl.
*H02K 41/035* (2006.01)
*H02K 41/02* (2006.01)

(52) U.S. Cl. ........................................ 310/12

(58) Field of Classification Search ............ 310/12–14, 310/254, 156
See application file for complete search history.

(56) References Cited

U.S. PATENT DOCUMENTS

| | | | |
|---|---|---|---|
| 3,746,899 A | 7/1973 | Eastham | |
| 3,770,995 A | 11/1973 | Eastham et al. | |
| 4,049,983 A | 9/1977 | Attwood et al. | |
| 4,107,558 A | 8/1978 | Brown | |
| 4,131,812 A | 12/1978 | English | |
| 4,392,073 A | 7/1983 | Rosenberry, Jr. | |
| 4,642,493 A | 2/1987 | Wallace | |
| 4,665,329 A | 5/1987 | Raschbichler | |
| RE32,654 E | 4/1988 | Jackson, Jr. | |
| 4,793,263 A | 12/1988 | Basic et al. | |
| 4,912,746 A | 3/1990 | Oishi | |
| 5,128,569 A | 7/1992 | Gladish | |
| 5,191,246 A | 3/1993 | Roxborough | |
| 5,252,877 A | 10/1993 | Sawa et al. | |
| 5,300,846 A | 4/1994 | Miller | |
| 5,744,879 A | 4/1998 | Stoiber | 310/12 |
| 5,864,187 A | 1/1999 | Gonzalez | |
| 5,910,691 A * | 6/1999 | Wavre | 310/12 |
| 6,433,446 B1 | 8/2002 | Sedgewick et al. | |
| 6,713,899 B1 * | 3/2004 | Greubel et al. | 310/12 |

(Continued)

FOREIGN PATENT DOCUMENTS

DE  4040116 A1  6/1992

(Continued)

Primary Examiner—Burton Mullins
(74) Attorney, Agent, or Firm—DLA Piper US LLP

(57) ABSTRACT

A linear brushless DC motor is disclosed which provides reduced detent force by way of a stack that features end teeth that are formed to be wedge shaped, and which has a length in the direction of motion which is approximately equal to $(N_p+\frac{1}{2}) \times$ pole pitch, where $N_p$ equals the number of poles covered by the armature of the brushless DC motor, and the pole pitch equals a distance between centers of two adjacent magnets of opposite polarity in a field assembly of the linear brushless DC motor.

25 Claims, 11 Drawing Sheets

U.S. PATENT DOCUMENTS 6,831,379 B2 * 12/2004 Ohto et al. .................. 310/12

FOREIGN PATENT DOCUMENTS

| EP | 0 334 645 | 9/1989 |
| --- | --- | --- |
| JP | 01047261 | 2/1989 |
| JP | 01047262 | 2/1989 |
| JP | 4-125054 | 4/1992 |
| JP | 5-83924 | 4/1993 |
| JP | 10-323012 | 12/1998 |
| JP | 2000333434 | 5/1999 |
| JP | 2000-308328 | 11/2000 |
| JP | 2002165434 | 11/2000 |
| WO | WO 02/082619 | 10/2002 |

* cited by examiner

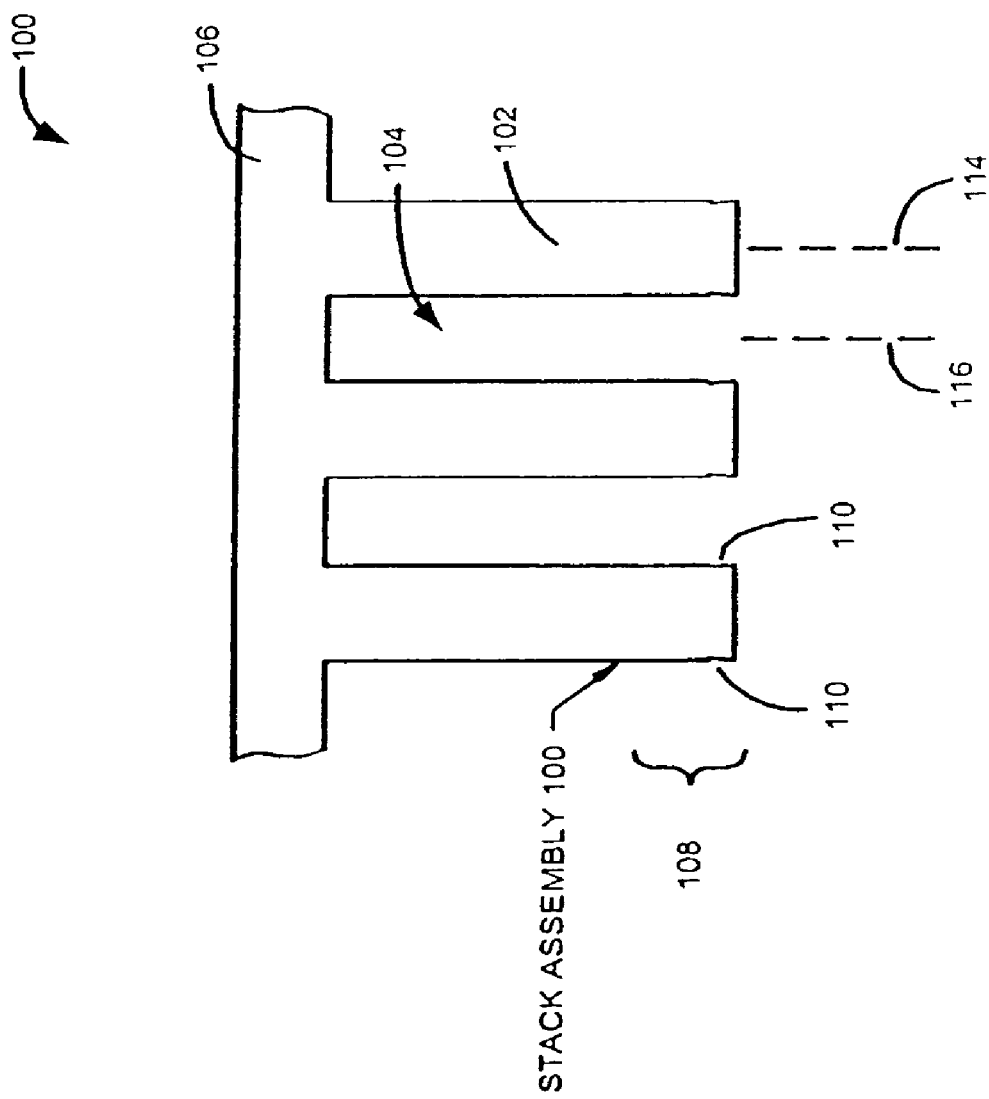

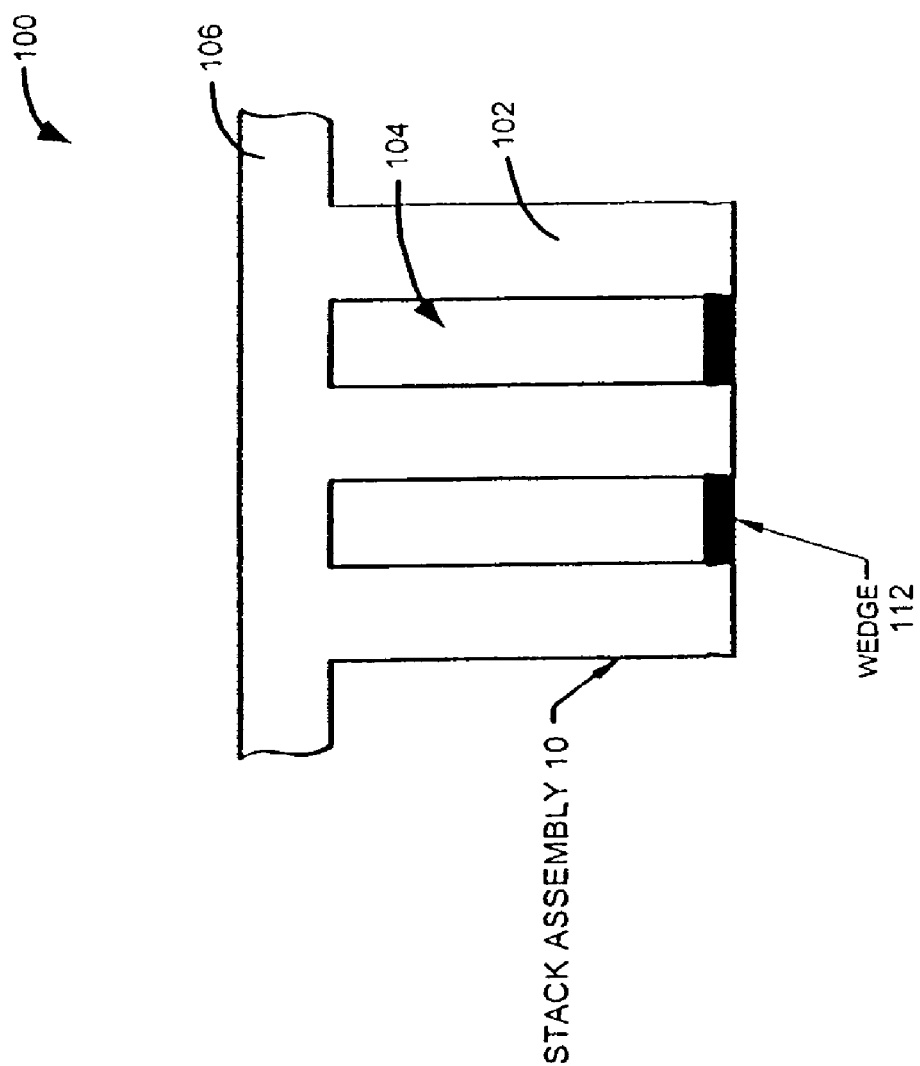

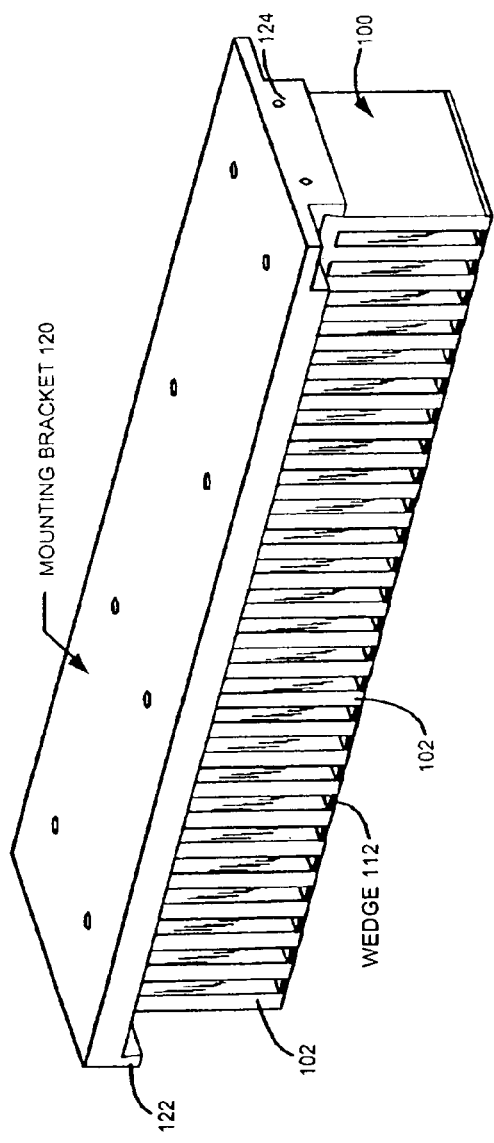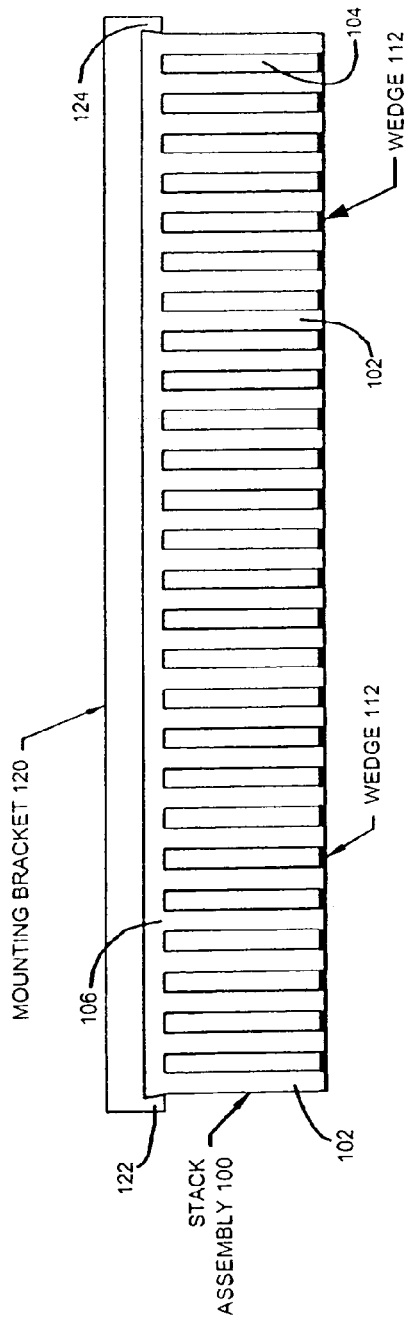
FIG. 5A
FIG. 5B

IRONCORE LINEAR BRUSHLESS DC MOTOR WITH REDUCED DETENT FORCE

RELATED APPLICATIONS

The present application claims priority under 35 U.S.C. §119(e) from provisional application No. 60/476,741, filed Jun. 6, 2003.

This is a continuation-in-part of U.S. patent application Ser. No. 10/116,495, filed Apr. 3, 2002 now U.S. Pat. No. 6,919,660, and assigned to the assignee of the present application, which claims the benefit of provisional application No. 60/282,546, filed Apr. 9, 2001.

TECHNICAL FIELD

The present disclosure is directed generally to linear brushless DC motors, and in particular to an ironcore linear brushless DC motor with reduced detent force.

BACKGROUND ART

A typical linear brushless motor of a rectangular configuration consists essentially of two parts: an armature assembly and a field assembly separated from each other by a small air gap.

An armature assembly, in turn, consists of a stack 10 of laminations with a three-phase winding positioned in its slots 12. Such a stack 10 is shown in FIG. 1. A field assembly is a rectangular soft magnetic plate with the rectangular magnets of alternating polarities facing the air gap.

Slot openings 14 for the armature assembly are normally selected to be as small as possible to minimize cogging forces. FIG. 2 shows typical slot openings 14. However, a small slot opening limits the size of the wire that can be used for the winding. In addition, any machine winding process becomes more difficult as the slot opening 14 gets smaller.

Additionally, in order to attach an armature assembly to a mechanical structure, the top surface 16 of the stack 10 should have drilled and tapped holes. Since laminations are not suitable for such holes, locking wedges 18 with mounting holes are provided, as shown in FIG. 1. Once the laminations are punched with the slots 20 for these locking wedges 18, the distance between locking wedges becomes fixed and cannot be changed without re-tooling the punch for the laminations.

U.S. patent application Ser. No. 10/116,495, filed Apr. 3, 2002, and assigned to the assignee of the present disclosure, addresses these disadvantages of prior armature assembly designs by providing an armature assembly design which facilitates winding of coils, while also minimizing cogging forces, and in which a mounting bracket structure is disclosed through which attachment to mechanical structures is simplified yet flexible.

There continues to be a need, however, for an armature design, which provides a reduction in detent forces caused by reluctance variations due to a finite length of the stack.

SUMMARY OF THE INVENTION

The above and other desirable features are provided by the present invention of a stack structure, and a linear brushless DC motor that incorporates such a stack structure, which can substantially reduce detent force, through the shaping of the end teeth of the stack, preferably where the end teeth are formed as wedges.

In one embodiment a stack design is provided for use in an armature assembly, including a plurality of windings, wherein the stack comprises a base portion, a plurality of teeth extending from the base portion and about which the windings can be positioned, and wherein the plurality of teeth are spaced apart from each other at a predetermined pitch, $t_t$, and including a first end tooth positioned at one end of the stack in a direction of motion and a second end tooth positioned at another end of the stack in the direction of motion; and wherein the first and second end teeth are wedge shaped, and further wherein the stack has a uniform length along a direction of motion approximately equal to a non-integer multiple of the number of poles under the armature, for example, a length of $(N_p+\frac{1}{2})\times t_p$, where $N_p$ corresponds to a number of poles underneath the armature, and $t_p$ corresponds to a distance between centers of two adjacent magnets of opposite polarity in a field assembly. Preferably, $t_t$ is slightly less than $t_p$, for example, a ratio of $t_t$ to $t_p$ may be 7:8.

In an embodiment of the present invention, the end teeth may have a right-triangular cross section in a plane along the direction of motion and parallel to the base portion, so as to have a width which is substantially zero at its apex, and at a maximum, $W_{max}$, along its base.

In a preferred embodiment of the present invention, Wmax may be approximately equal to $t_p$. Further, the area of the right-triangular cross section of the end teeth may be approximately equal to the area of the cross sections of interior teeth of the stack.

These and other features and advantages of the disclosed embodiments will be more readily understood upon consideration of the detailed description and accompanying drawings.

BRIEF DESCRIPTION OF THE DRAWINGS

FIG. 3 is an illustration of a portion of a stack assembly configuration, which facilitates winding of coils while reducing cogging forces.

FIG. 4 is an illustration of a portion of a stack assembly in which the slot openings of FIG. 3 have been plugged in accordance with a configuration which facilitates winding of coils while reducing cogging forces.

FIGS. 5A and 5B illustrate a stack assembly including a mounting bracket in accordance with a configuration that provides a simplified yet flexible attachment structure, and also illustrate the wedges of the embodiment of FIG. 4.

DETAILED DESCRIPTION OF THE DISCLOSED EMBODIMENTS

Reference is made to U.S. patent application Ser. No. 10/116,495, filed Apr. 3, 2002, and assigned to the assignee of the present disclosure, and which is incorporated herein by reference.

Figure 1:
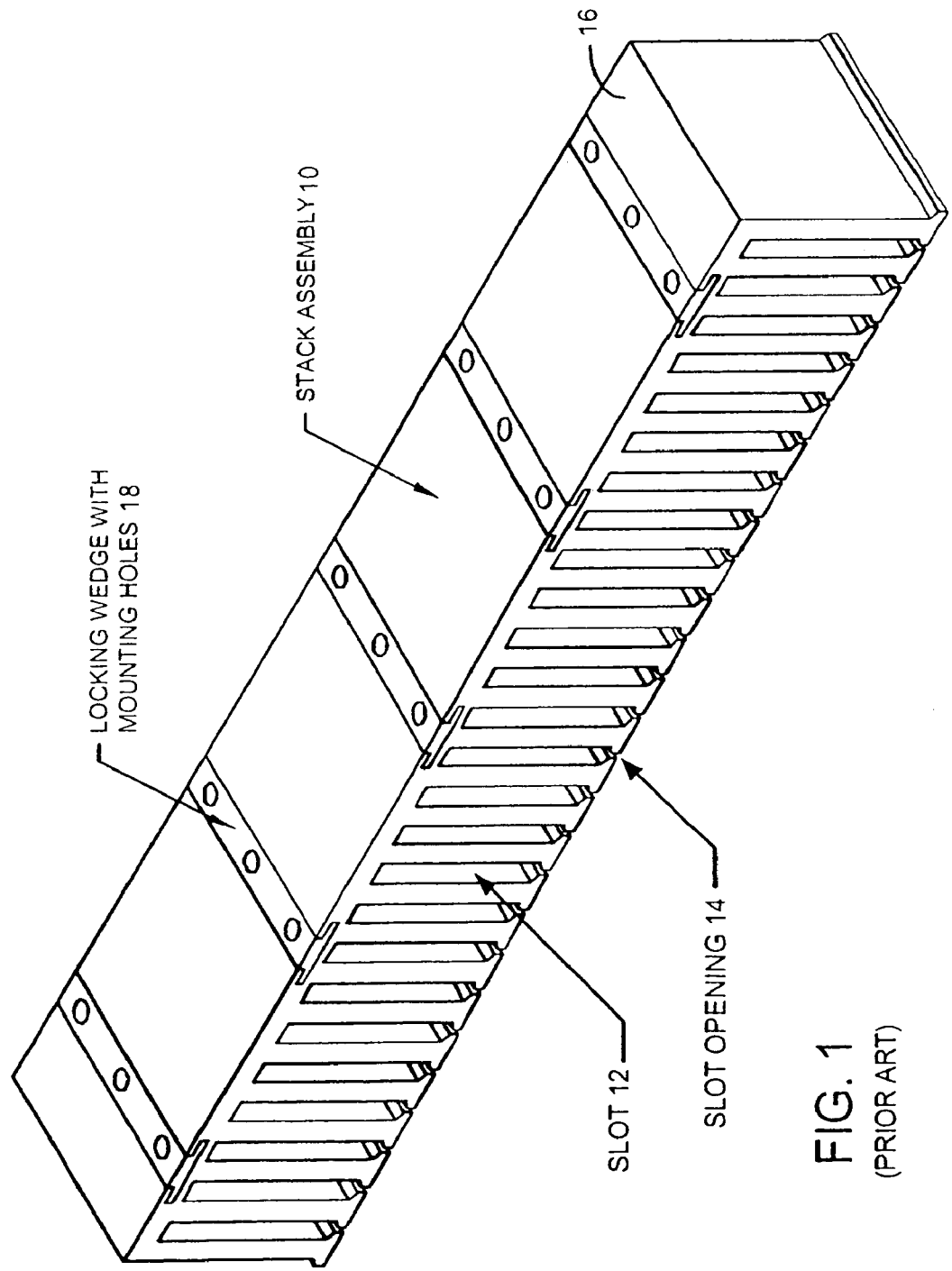
FIG. 1 is an illustration of a typical stack assembly in the prior art.
Figure 2:
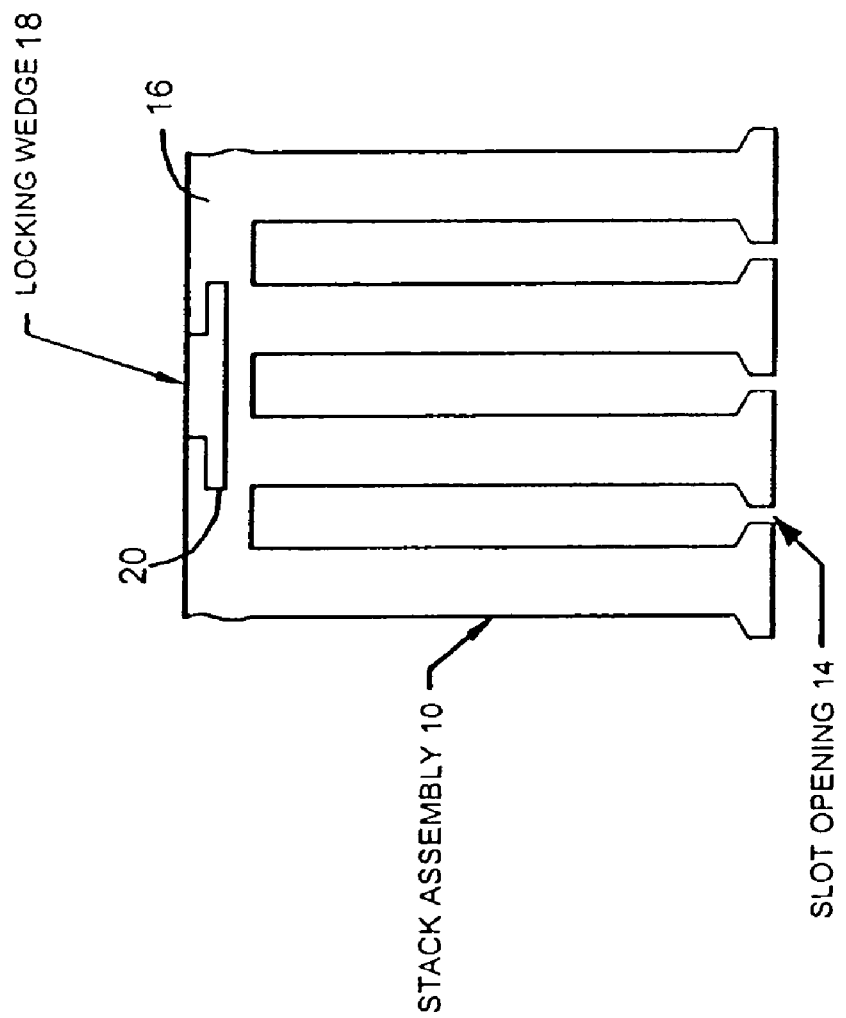
FIG. 2 is an illustration of a portion of a typical stack assembly in the prior art.

Referring now to FIG. 3, a portion of the stack assembly 100 of a configuration, which facilitates winding of coils while reducing cogging forces, is illustrated. As can be seen from the figure, the teeth 102 of the stack extend outwardly from base portion 106. The width of the slots 104 separating teeth 102 is substantially the same from bottom (at the base portion 106) to top portion 108 (free ends of the teeth). This is in contrast to tooth designs of previous stack assemblies, for example in FIG. 2, in which the top end of the teeth flares outwardly to narrow the slot opening 14 between teeth.

According to this embodiment, the top portion 108 of each tooth 102 has two additional notches 110, as can be seen in FIG. 3, to accommodate magnetic wedges 112, as illustrated in FIG. 4. The purpose of these magnetic wedges 112 is to minimize the difference in the air gap reluctance along the centerline 114 of a tooth 102 and the centerline 116 of a slot 104. The smaller this difference is, the lower the cogging force will be.

According to a further embodiment, illustrated in FIGS. 5A and 5B, a composite armature assembly includes the stack assembly 100 with the winding (not shown), magnetic wedges 112 in the slots 104, and a mounting bracket 120 made from soft magnetic material. Preferably, mounting bracket 120 has a dimension along the longitudinal axis of stack assembly 100 which is greater than that of mounting bracket 120, and has a thickness which is preferably greater than the thickness of base portion 106 of stack assembly 100. As can be seen from FIG. 5A, the width dimension (transverse to the longitudinal axis of stack assembly 100, is also preferably greater than the width dimension of the stack. Preferably a dovetail arrangement is employed which allows a precise fit between the stack assembly 100 and the mounting bracket 120.

This preferred dovetail arrangement is further illustrated in FIG. 5B. At the ends of stack 100 it can be seen that the base portion 106 has a surface which is angled outwardly in a direction toward the outer surface of base portion 106. It can also be seen that the ends of mounting bracket 120 have portions 122 and 124 which extend downwardly in the direction of teeth 102, and which have inner surfaces which are shaped to be compliments of the ends of base portion 106. In particular, the inner surfaces of portions 122 and 124 flare inwardly so that portions 122 and 124 capture the outwardly flared ends of base portion 106. While a dovetail arrangement has been disclosed as a preferred arrangement, it is to be understood that other arrangements can be used to position mounting bracket 120 on base portion 106 of stack assembly 100 within the spirit of the disclosed embodiments.

Since not all of the back iron (base 106 and mounting bracket 120) is laminated in the embodiment shown in FIGS. 5A and 5B, there will be additional eddy current losses in the solid portion of the back iron (mounting bracket 120). However, the flux density in the solid portion of the back iron is relatively low because its cross-section is larger than that of the laminated portion (see FIG. 5B). Therefore, additional eddy current losses proportional to the (flux density)$^2$ will also be low.

With the configuration of the mounting bracket of the disclosed embodiment there is no need for retooling of a lamination punch in order to accommodate changes in distance between mounting holes, and mounting hole configurations can be changed by replacing a single bracket instead of the multiple wedges of the prior art.

Figure 6:
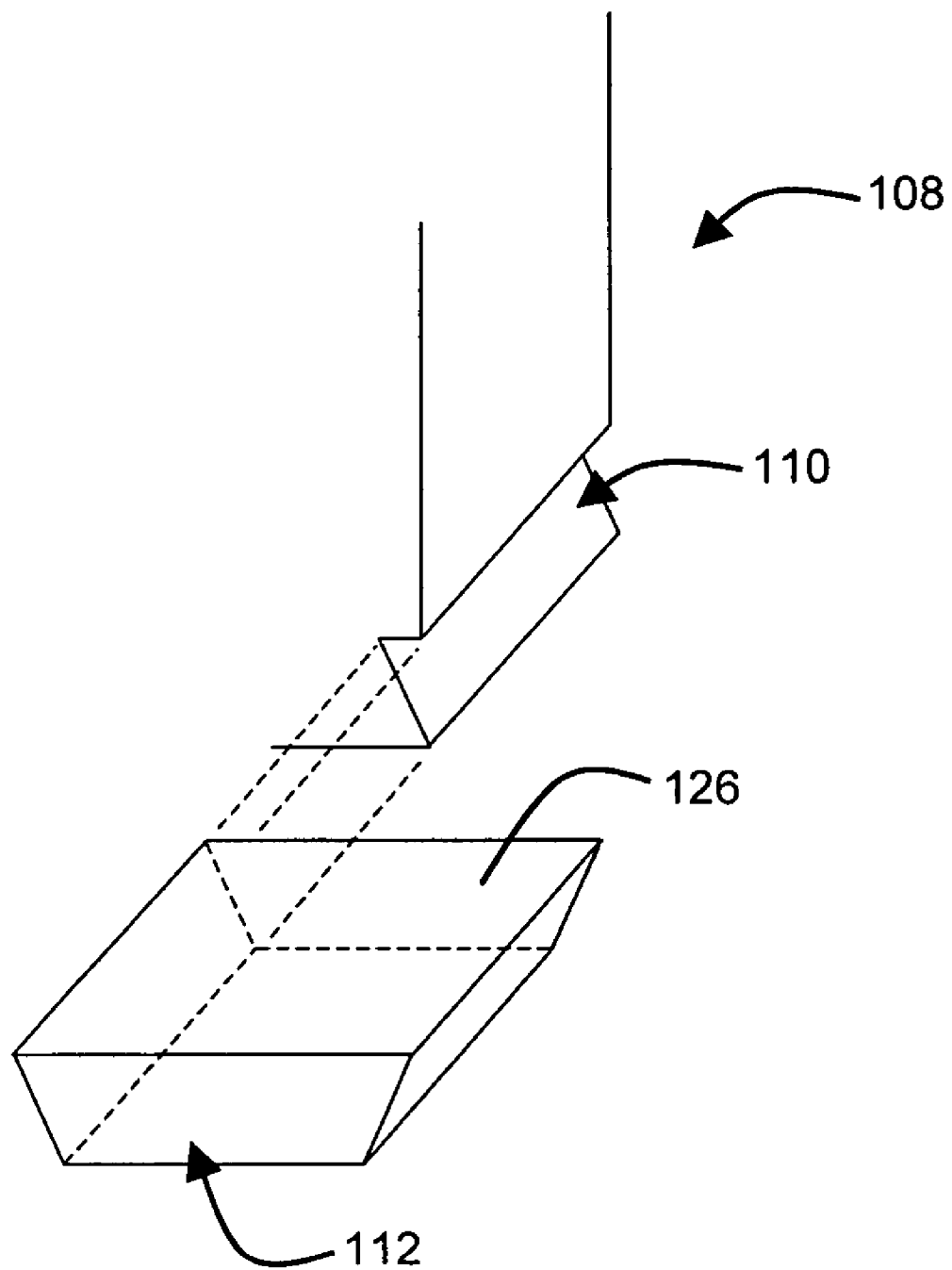
FIG. 6 is an enlarged view of a portion of a tooth and of a wedge in the stack of a configuration, which facilitates winding of coils while reducing cogging forces.

FIG. 6 is an expanded view of the relationship between the solid or laminated magnetic wedges 112 and the notches 110, which are formed in the top portion 108 of teeth 102 of the armature stack assembly 100 of the disclosed embodiment. Preferably a dovetail arrangement is employed to provide a precise fit between teeth 102 and wedge 112. As can be seen from FIG. 6, wedge 112 is formed to have a trapezoidal cross section, with the length dimension for the wedge surface 126 which faces inwardly toward the windings (not shown) being larger than the length dimension for the surface which faces outwardly away from the windings. Notch 110, which is cut in top portion 108 of each tooth 102, is shaped to compliment the dimensions of wedge 112, so that a dovetail fit is achieved between notch 110 and wedge 112. It is to be noted that for the embodiment of FIG. 6, wedge 112 is sized so that the surface, which faces outwardly, away from the windings, is substantially flush with the outwardly facing surface of tooth 102 when wedge 112 is in place in notch 110.

While a dovetail arrangement has been disclosed as a preferred arrangement, it is to be understood that other arrangements can be used to position wedge 112 between adjacent teeth 102 within the spirit of the disclosed embodiments.

While the above embodiments feature improved performance, there is still a need to reduce detent forces due to reluctance variations caused by the finite length of the stack.

Figure 7:
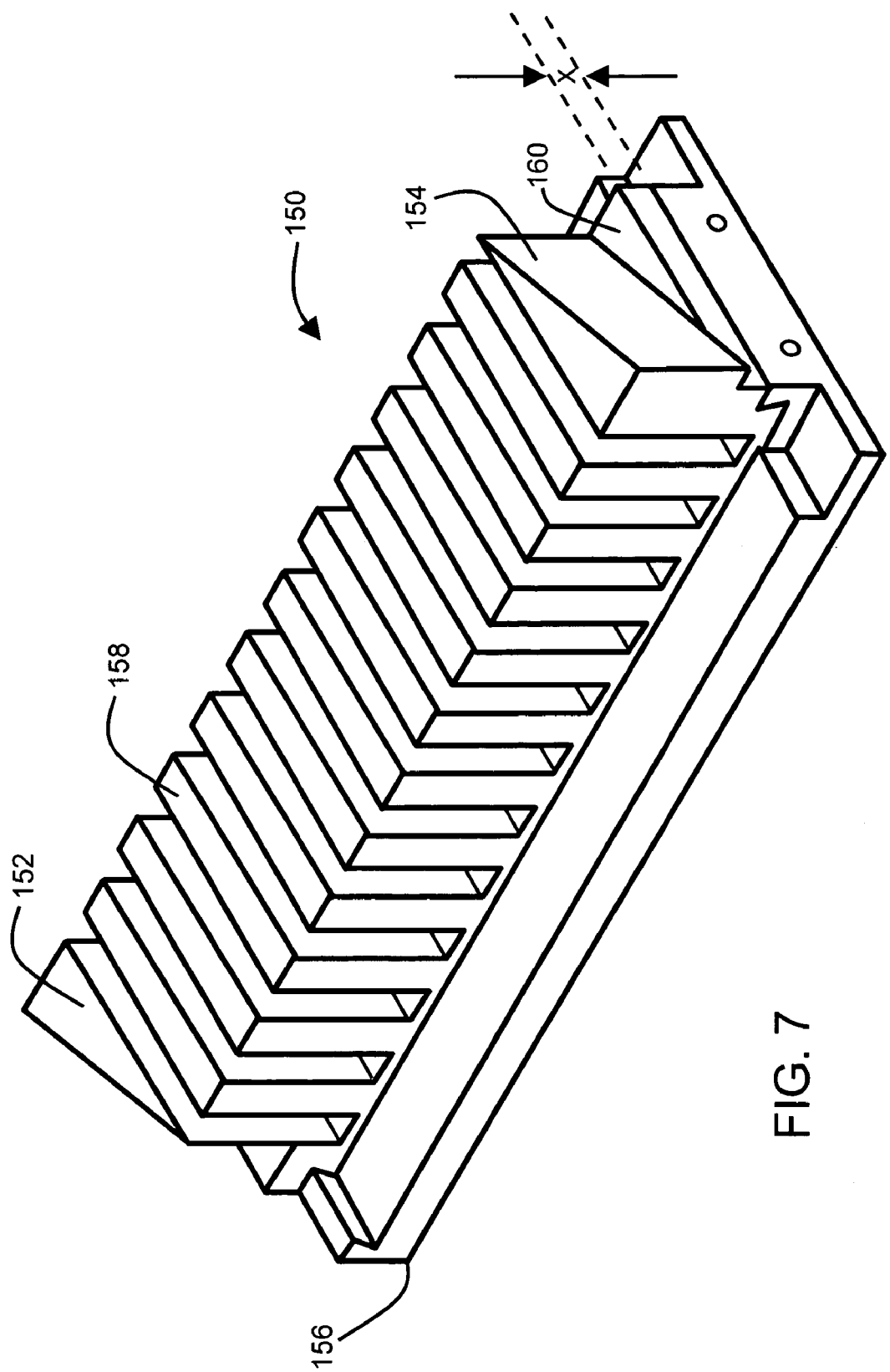
FIG. 7 is a perspective view of a stack assembly in accordance with an embodiment of the present invention.
Figure 8:
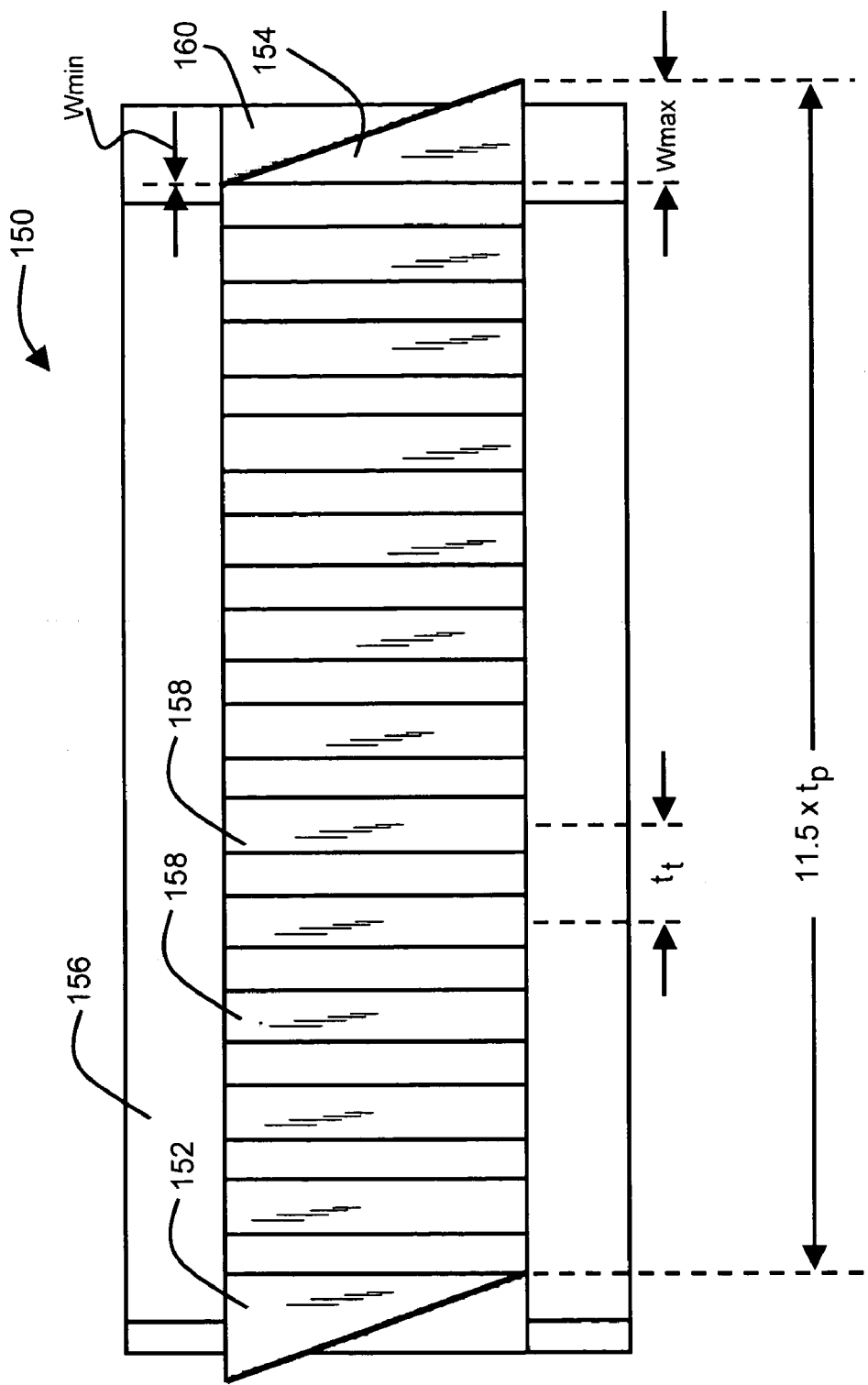
FIG. 8 is a plan view of the stack assembly embodiment of FIG. 7.
Figure 9:
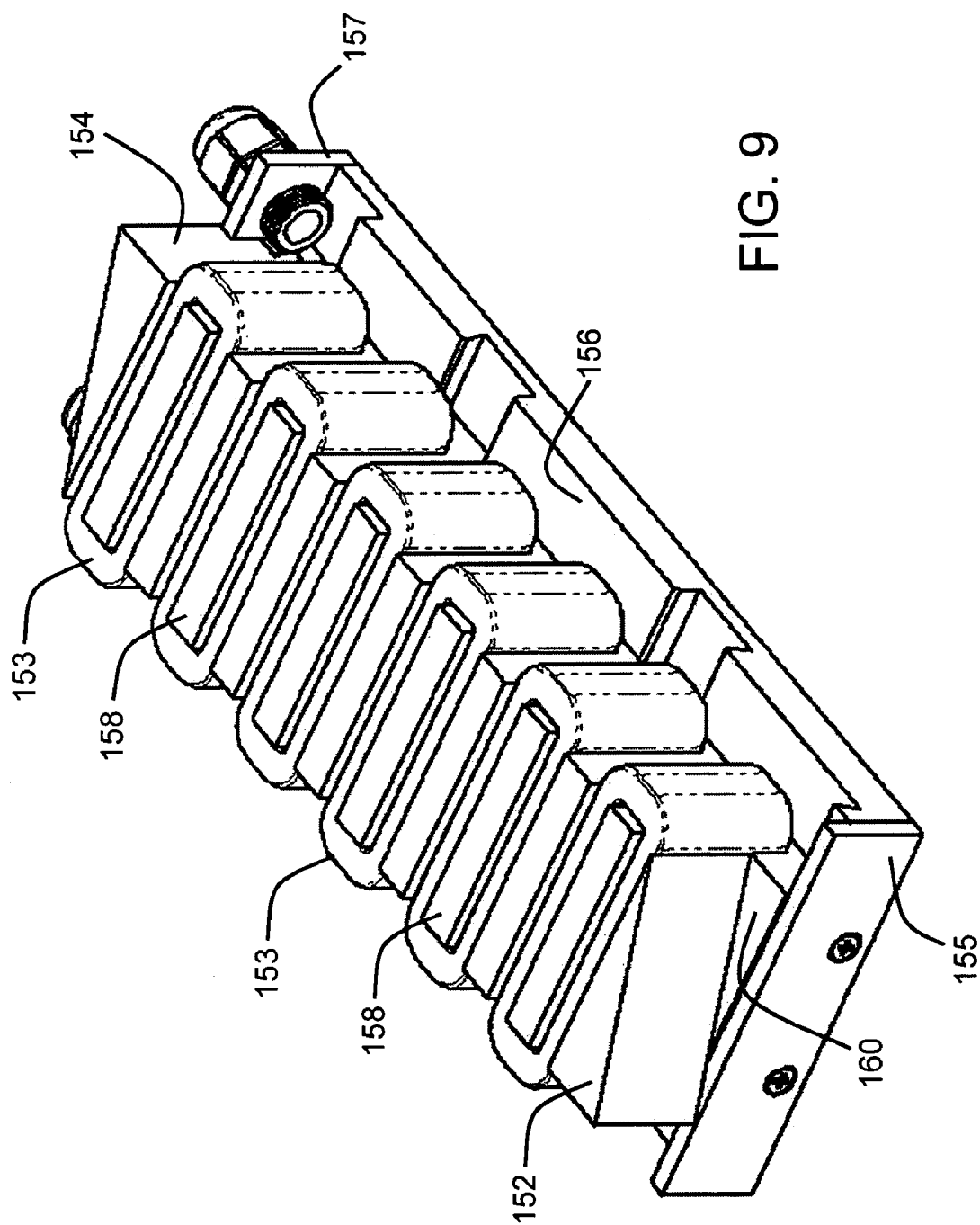
FIG. 9 is a perspective view of an armature assembly employing the stack assembly of FIG. 7.
Figure 10:
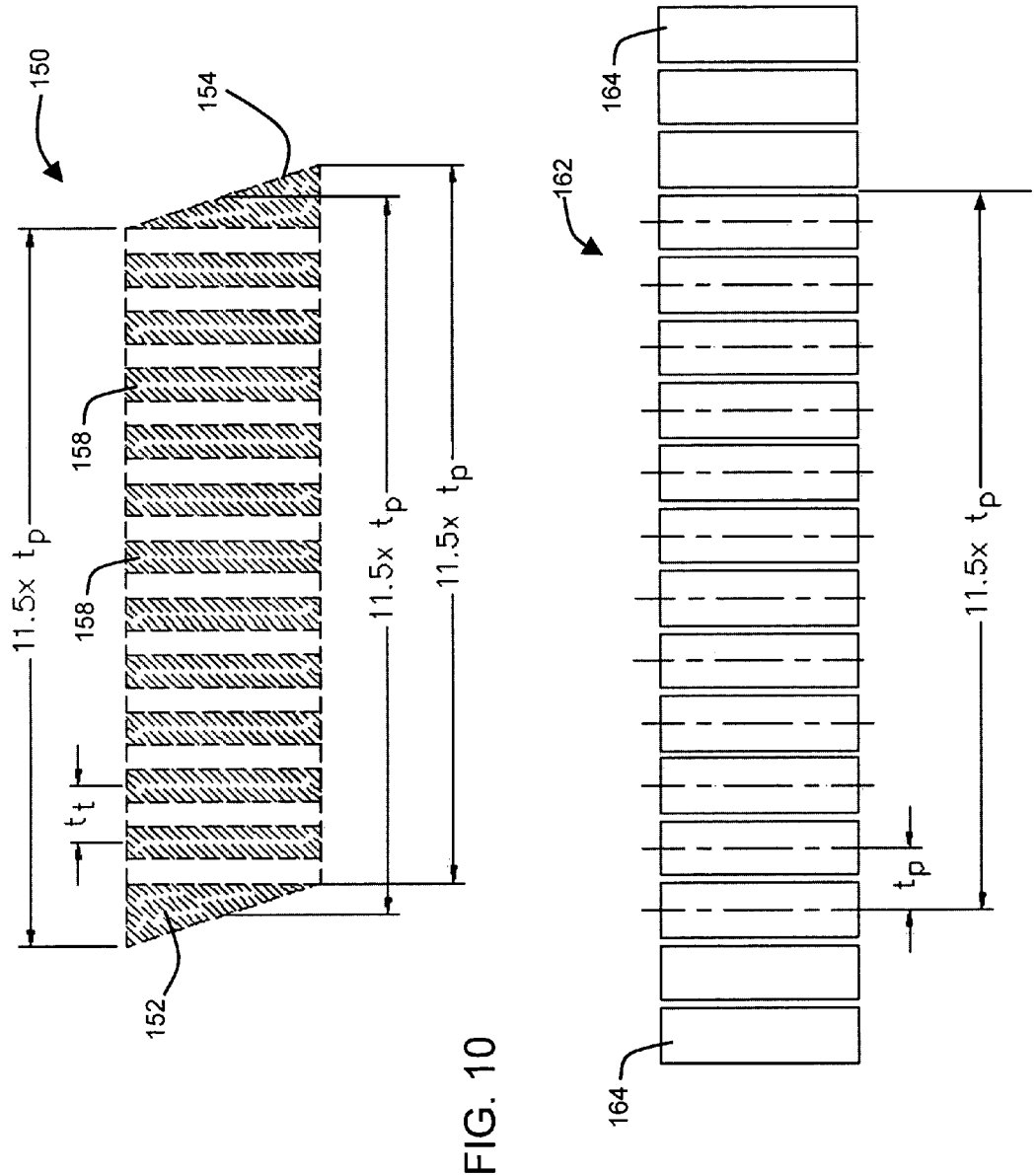
FIG. 10 illustrates a preferred relationship between the dimensions of the stack assembly and the magnets of a field assembly in accordance with a preferred embodiment of the present invention.

Referring now to FIGS. 7, 8, 9, 10, 11A, 11B, and 11C, an embodiment of the present invention is disclosed which provides an ironcore linear brushless DC motor with reduced detent force. In particular, the embodiment includes a feature, which substantially reduces detent force of the linear motor by shaping the end teeth 152, 154 of the stack 150 as wedges. In the preferred configuration of this embodiment, the end teeth may have a right-triangular cross section in a plane parallel to mounting bracket 156, with the hypotenuse of the cross section facing outwardly from the ends of the stack 150. The maximum width, $W_{max}$, of wedge-shaped end-teeth 152 and 154, in the direction of motion, may be approximately equal to the center-to-center spacing, $t_p$, between magnets 164 (FIG. 10). Further, the minimum width, $W_{min}$, of wedge-shaped end-teeth 152 and 154, in the direction of motion, is substantially zero (FIG. 8). Also, it is to be noted that at the point of maximum width, $W_{max}$, the wedge-shaped end teeth 152 and 154 each extend outwardly beyond the mounting bracket 156, for example by about $W_{max}/3$.

Another feature of the embodiment of FIGS. 7, 8, 9, 10, 11A, 11B, and 11C is that the outward faces of wedge-shaped end teeth 152 and 154 do not extend to the full depth as the faces of internal teeth 158. From FIG. 7 it can be seen that a step 160, having a thickness x, is provided between the mounting bracket and the outward face of wedge-shaped end teeth 152 and 154.

FIG. 9 illustrates an armature assembly, which incorporates the stack 150 of FIGS. 7 and 8. Windings 153 are shown surrounding every other internal tooth 158. Also shown are end brackets 155 and 157, which may be fastened to ends of mounting bracket 156, underlying wedge-shaped end teeth 152 and 154, respectively. Mounting bracket 156 can be seen to have dovetail type coupling structures at its ends and interior. The beveling of the dovetail type structures at the ends of mounting bracket 156 can be seen in greater detail in FIG. 7.

As illustrated in FIG. 10, preferably, the total length of the stack 150 along the direction of motion remains constant and may be equal to $(N_p+\frac{1}{2}) \times t_p$. In this relationship, $N_p$ is the number of poles underneath the stack 150 (for example, 8, 10, 12 etc.), and $t_p$ is the pole pitch, which is the distance between the centers of two adjacent magnets 164 of opposite polarity in a field assembly 162 with which the stack 150 is used. For example, disclosed in FIG. 10, are a stack assembly 150 and the spacings for magnets 164 of a field assembly 162 for an ironcore linear brushless DC motor with reduced detent force, in which the pole pitch, $t_p$, may be 16 mm, and the number of poles underneath the stack, $N_p$, may equal eleven (11). In such a configuration, the length of the stack 150 may be $16\times(11+\frac{1}{2})=184$ mm. With this approach, the stack 150 may cover approximately the same number of magnets (in this case—11.5) regardless of the position of the stack relative to the field (magnet) assembly.

In the foregoing example, the width of internal teeth 158 of stack 150 may be approximately 8.2 mm, and the center to center spacing, $t_t$, between internal teeth 158 may be approximately 14 mm. Further, the width of the magnets of the field assembly, in the direction of motion, may be approximately 14.4 mm. It is also to be noted, because of the tapering of end teeth 152 and 154, the stack 150 has the same "length" (in the direction of motion) at any point transverse to the direction of motion. This is illustrated in the top portion of FIG. 10 in which the same dimension $11.5 \times t_p$ is indicated along the top, middle and bottom dimensions of stack 150.

A principal feature of the disclosed configuration of the stack 150 relative to the field assembly 162, is that the stack surface "covers" the same (on average) number of magnets, and the reluctance does not substantially change as a function of stack position. In this embodiment, the number of slots (teeth) per pole is close to one (12 slots vs. 11 poles). This means that the pole pitch, $t_p$, is almost the same as the tooth pitch, $t_t$. In a conventional stack configuration, a stack of laminations with all straight teeth would have covered an integer number of pole pitches. (In this case, eleven.) In, contrast, the configuration of the disclosed embodiment covers a fractional number of pole pitches (11.5 in this case). In accordance with the example of FIG. 10, the length of any longitudinal cross-section of the stack is equal to 11.5 pole pitches. In terms of numbers of teeth versus numbers of poles for this embodiment, it can be seen that the number of teeth in the stack, including end teeth, equals $N_p+1$.

Figure 11A:
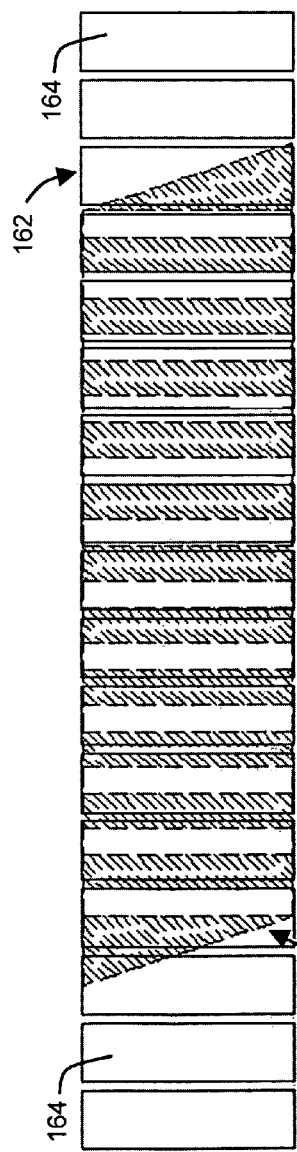
FIGS. 11A, 11B and 11C illustrate three positions of the stack relative to the field assembly in accordance with a preferred embodiment of the present invention.
Figure 11B:
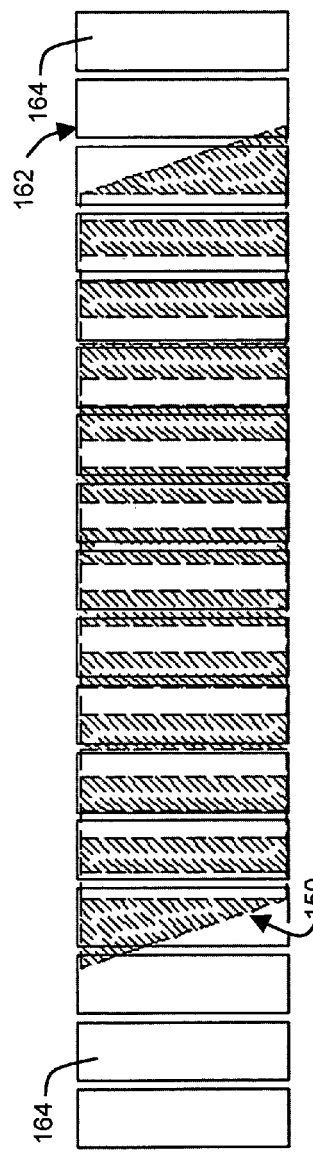
Figure 11C:
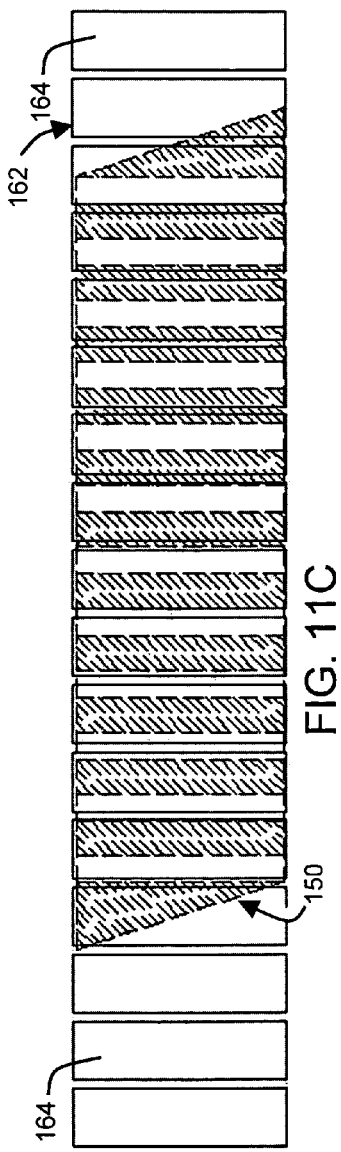

FIGS. 11A, 11B, and 11C illustrates three positions of the stack 150 relative to the field (magnet) assembly 162, showing that the "coverage" of the stack surface with respect to the magnets 164 is the same for each position. Thus, for example, in FIG. 11A, the footprint of stack 150 relative to field assembly 162 at any longitudinal section along the direction of motion can be seen to cover approximately 11.5 magnets 164. At the top of the drawing in FIG. 11A, the left side of the footprint of stack 150 begins at the center of a magnet 164, and extends to the right (a direction of motion) over eleven entire magnets. The middle of the footprint begins at the left edge of a magnet and extends to the right over ten and one-half additional magnets. It can be seen from FIGS. 11A, 11B and 11C, that for the illustrated embodiment, the bases of the wedge shapes of the end teeth 152 and 154 of stack 150, have a length approximately equal to the pole pitch, $t_p$. It can also be seen that in the embodiment illustrated, the tooth pitch, $t_t$, is less than $t_p$, but greater than at least $0.75\ t_p$. A further feature illustrated in FIGS. 11A, 11B and 11C, is that for the various positions of stack 150 relative to the magnets 164 in the range of motion of the linear brushless DC motor, there will be at least one magnet that is covered by no more than one of the teeth of stack.

Theoretically, in the absence of the fringe flux, the detent force due to a finite length of the stack in the direction of motion would be zero, and the detent force may be eliminated. In practice, the detent force is significantly reduced and is almost suppressed, and movement has been found to be very smooth.

The terms and expressions which have been employed herein are intended as terms of description and not of limitation, and there is no intent in the use of such terms and expressions of excluding equivalents of the features shown and described, or portions thereof, it being recognized that various modifications are possible within the scope of the disclosed embodiments.

What is claimed is:

1. An armature assembly including
a plurality of windings;
a base portion;
a plurality of teeth extending from the base portion to form a stack and about which the windings can be positioned, and wherein the plurality of teeth are spaced apart from each other at a predetermined pitch, $t_t$, to define slot openings at ends of and between adjacent teeth, and including a first end tooth positioned at one end of the stack in a direction of motion and a second end tooth positioned at another end of the stack in the direction of motion; and
wherein the first and second end teeth are formed to have a wedge shape, and
further wherein a length of the stack in any cross-section in the direction of motion is selected so that the stack covers an area of a plurality of magnets in a field assembly corresponding to a non-integer number of magnets which area is substantially the same over a range of motion and
further wherein the first and second end teeth each have a portion which extends outwardly beyond the base portion in the direction of motion.

2. An armature assembly including
a plurality of windings;
a base portion;
a plurality of teeth extending from the base portion to form a stack and about which the windings can be positioned, and wherein the plurality of teeth are spaced apart from each other to define slot openings at ends of and between adjacent teeth, and including a first end tooth positioned at one end of the stack in a direction of motion and a second end tooth positioned at another end of the stack in the direction of motion; and
wherein the first and second end teeth are formed to have a wedge shape; and
wherein the armature has a length in a direction of motion which is approximately equal to $(N_p+\frac{1}{2}) \times$ pole pitch, where $N_p$ equals a number of poles underneath the armature, and the pole pitch equals a distance between centers of two adjacent magnets of opposite polarity in a field assembly.

3. The armature assembly of claim 2, wherein the stack has $N_p+1$ teeth.

4. A stack for use in an armature assembly including a plurality of windings, wherein the stack comprises a base portion;

a plurality of teeth extending from the base portion and about which the windings can be positioned, and wherein the plurality of teeth are spaced apart from each other at a predetermined pitch, $t_t$, and including a first end tooth positioned at one end of the stack in a direction of motion and a second end tooth positioned at another end of the stack in the direction of motion; and wherein the first and second end teeth are wedge shaped, and further wherein the stack has a uniform length along a direction of motion approximately equal to $(N_p+\frac{1}{2}) \times t_p$, where $N_p$ corresponds to a number of poles underneath the armature, and $t_p$ corresponds to a distance between centers of two adjacent magnets of opposite polarity in a field assembly.

5. The stack of claim 4 in which $t_p$ is approximately equal to $t_t$.

6. The stack of claim 4, wherein $t_p$ and $t_t$, and the length of the stack are dimensioned so that a fractional number of magnets of the field assembly are covered by pole pitches of the stack.

7. A linear brushless DC motor, comprising a field assembly, including a plurality of magnets of alternating polarity positioned along a direction of motion to define a plurality of poles; and an armature assembly including a plurality of windings and a stack, wherein the stack comprises:

a base portion;

a plurality of teeth extending from the base portion and about which the windings can be positioned, and including a first end tooth positioned at one end of the stack in the direction of motion and a second end tooth positioned at another end of the stack in the direction of motion; and wherein the first and second end teeth are formed to be wedge shaped, and further wherein the stack has a uniform length along the direction of motion approximately equal to $(N_p+\frac{1}{2}) \times t_p$, where $N_p$ corresponds to a number of poles underneath the armature, and $t_p$ corresponds to a distance between centers of two adjacent magnets of opposite polarity in the field assembly.

8. The linear brushless DC motor of claim 7, wherein the plurality of teeth are spaced apart from each other at a predetermined pitch, $t_t$, that is less than $t_p$.

9. The linear brushless DC motor of claim 8, further wherein $t_t$ and $t_p$ are selected so that the stack covers an area of the plurality of magnets that is substantially the same over a range of motion of the motor.

10. The linear brushless DC motor of claim 8, further wherein $t_t$ and $t_p$ are selected so that in any position over a range of motion of the motor at least one of the plurality of magnets is covered by no more than one of the plurality of teeth.

11. The linear brushless DC motor of claim 8, wherein the first and second end teeth have a cross section in a plane parallel to the base in the shape of a right triangle having a base parallel to the direction of motion and an apex opposite the base, and further wherein the base is substantially equal in length to $t_p$.

12. The linear brushless DC motor of claim 11, wherein the plurality of teeth, other than the first and second end teeth, have a cross section in a plane parallel to the base which is substantially equal in area to an area of the cross sections of the first and second end teeth.

13. The linear brushless DC motor of claim 8, wherein internal teeth of the stack have a cross sectional width of approximately one half $t_p$ and the plurality of magnets have a cross sectional width approximately equal to but greater than $t_t$.

14. The linear brushless DC motor of claim 8, wherein a ratio of $t_t$ to is 7:8.

15. The linear brushless DC motor of claim 7, wherein the stack has $N_{p+}1$ teeth.

16. The linear brushless DC motor of claim 7, wherein the plurality of teeth include parallel faces transverse to the direction of motion and having a predetermined height, and further wherein the first and second end teeth have at least one face which is angled with respect to the direction of motion and which has a height less than the predetermined height of the parallel faces.

17. The linear brushless DC motor of claim 16, further including a step having a thickness x and extending in the direction of motion from the base of each of the first and second end teeth.

18. The linear brushless DC motor of claim 7 further including a unitary mounting bracket extending substantially the length of the stack in the direction of motion and coupled to the stack with dove-tail type structures, and further wherein the unitary mounting bracket is adapted to accommodate mounting holes for the linear brushless DC motor.

19. An armature assembly including a plurality of windings;

a base portion;

a plurality of teeth extending from the base portion to form a stack and about which the windings can be positioned, and wherein the plurality of teeth are spaced apart from each other to define slot openings at ends of and between adjacent teeth, and including a first end tooth positioned at one end of the stack in a direction of motion and a second end tooth positioned at another end of the stack in the direction of motion; and wherein the first and second end teeth are formed to have a wedge shape;

wherein the plurality of teeth are spaced apart from each other at a predetermined pitch, $t_t$, that is less than a pole pitch, $t_p$, wherein the pole pitch equals a distance between centers of two adjacent magnets of opposite polarity in a field assembly; and further wherein $t_t$ and the pole pitch are selected so that in any position over a range of motion of the motor at least one of the plurality of magnets is covered by no more than one of the plurality of teeth.

20. An armature assembly including a plurality of windings;

a base portion;

a plurality of teeth extending from the base portion to form a stack and about which the windings can be positioned, and wherein the plurality of teeth are spaced apart from each other to define slot openings at ends of and between adjacent teeth, and including a first end tooth positioned at one end of the stack in a direction of motion and a second end tooth positioned at another end of the stack in the direction of motion; and wherein the first and second end teeth are formed to have a wedge shape;

wherein the plurality of teeth are spaced apart from each other at a predetermined pitch, $t_t$, that is less than a pole pitch, $t_p$, wherein the pole pitch equals a distance between centers of two adjacent magnets of opposite polarity in a field assembly; and wherein the first and second end teeth have a cross section in a plane parallel to the base in the shape of a right triangle having a base parallel to the direction of motion and an apex opposite the base, and further wherein the base is substantially equal in length to the pole pitch.

21. The armature assembly of claim 20, wherein the plurality of teeth, other than the first and second end teeth, have a cross section in a plane parallel to the base which is substantially equal in area to an area of the cross sections of the first and second end teeth.

22. An armature assembly including
a plurality of windings;
a base portion;
a plurality of teeth extending from the base portion to form a stack and about which the windings can be positioned, and wherein the plurality of teeth are spaced apart from each other to define slot openings at ends of and between adjacent teeth, and including a first end tooth positioned at one end of the stack in a direction of motion and a second end tooth positioned at another end of the stack in the direction of motion; and
wherein the first and second end teeth are formed to have a wedge shape;
wherein the plurality of teeth are spaced apart from each other at a predetermined pitch, $t_t$, that is less than a pole pitch, $t_p$, wherein the pole pitch equals a distance between centers of two adjacent magnets of opposite polarity in a field assembly; and
wherein internal teeth of the stack have a cross sectional width of approximately one half the pole pitch and the plurality of magnets have a cross sectional width approximately equal to but greater than $t_t$.

23. An armature assembly including
a plurality of windings;
a base portion;
a plurality of teeth extending from the base portion to form a stack and about which the windings can be positioned, and wherein the plurality of teeth are spaced apart from each other to define slot openings at ends of and between adjacent teeth, and including a first end tooth positioned at one end of the stack in a direction of motion and a second end tooth positioned at another end of the stack in the direction of motion; and
wherein the first and second end teeth are formed to have a wedge shape;
wherein the plurality of teeth include parallel faces transverse to the direction of motion and having a predetermined height, and further wherein the first and second end teeth have at least one face which is angled with respect to the direction of motion and which has a height less than the predetermined height of the parallel faces; and
further including a step having a thickness x and extending in the direction of motion from a base of each of the first and second end teeth.

24. An armature assembly including
a plurality of windings;
a base portion;
a plurality of teeth extending from the base portion to form a stack and about which the windings can be positioned, and wherein the plurality of teeth are spaced apart from each other at a predetermined pitch, $t_t$, to define slot openings at ends of and between adjacent teeth, and including a first end tooth positioned at one end of the stack in a direction of motion and a second end tooth positioned at another end of the stack in the direction of motion; and
wherein the first and second end teeth are formed to have a wedge shape. and
further wherein a length of the stack in any cross-section in the direction of motion is selected so that the stack covers an area of a plurality of magnets in a field assembly corresponding to a non-integer number of magnets which area is substantially the same over a range of motion and
further wherein a unitary mounting bracket extending substantially the length of the stack in the direction of motion and coupled to the stack with dovetail type structures, and
further wherein the unitary mounting bracket is adapted to accommodate mounting holes for a linear brushless DC motor formed with the armature assembly.

25. An armature assembly including
a plurality of windings;
a base portion;
a plurality of teeth extending from the base portion to form a stack and about which the windings can be positioned, and wherein the plurality of teeth are spaced apart from each other to define slot openings at ends of and between adjacent teeth, and including a first end tooth positioned at one end of the stack in a direction of motion and a second end tooth positioned at another end of the stack in the direction of motion; and
wherein the first and second end teeth are formed to have a wedge shape;
wherein the plurality of teeth are spaced apart from each other at a predetermined pitch, $t_t$, that is less than a pole pitch, $t_p$, wherein the pole pitch equals a distance between centers of two adjacent magnets of opposite polarity in a field assembly; and
wherein a ratio of $t_t$ to the pole pitch is 7:8.

* * * * *